(12) United States Patent
Yang et al.

(10) Patent No.: US 11,367,268 B2
(45) Date of Patent: Jun. 21, 2022

(54) CROSS-DOMAIN IMAGE PROCESSING FOR OBJECT RE-IDENTIFICATION

(71) Applicant: NVIDIA Corporation, Santa Clara, CA (US)

(72) Inventors: Xiaodong Yang, Fremont, CA (US); Yang Zou, Pittsburgh, PA (US); Zhiding Yu, Santa Clara, CA (US); Jan Kautz, Lexington, MA (US)

(73) Assignee: NVIDIA CORPORATION, Santa Clara, CA (US)

(*) Notice: Subject to any disclaimer, the term of this patent is extended or adjusted under 35 U.S.C. 154(b) by 101 days.

(21) Appl. No.: 16/998,890

(22) Filed: Aug. 20, 2020

(65) Prior Publication Data

US 2021/0064907 A1 Mar. 4, 2021

Related U.S. Application Data

(60) Provisional application No. 62/892,118, filed on Aug. 27, 2019.

(51) Int. Cl.
*G06K 9/44* (2006.01)
*G06V 10/34* (2022.01)
(Continued)

(52) U.S. Cl.
CPC ........... *G06V 10/34* (2022.01); *G06K 9/6256* (2013.01); *G06K 9/6259* (2013.01);
(Continued)

(58) Field of Classification Search
CPC ........ G06K 9/44; G06K 9/00744; G06K 9/46; G06K 9/6256; G06K 9/6259;
(Continued)

(56) References Cited

U.S. PATENT DOCUMENTS

2019/0362247 A1* 11/2019 Baker .................... G06N 20/00
2020/0097742 A1* 3/2020 Ratnesh Kumar ... G06N 3/0481
(Continued)

OTHER PUBLICATIONS

Zheng et al., "Joint Discriminative and Generative Learning for Person Re-identification," CVPR, 2019, pp. 2138-2147, retrieved from https://openaccess.thecvf.com/content_CVPR_2019/papers/Zheng_Joint_Discriminative_and_Generative_Learning_for_Person_Re-Identification_CVPR_2019_paper.pdf, (Year 2019).
(Continued)

*Primary Examiner* — Juan A Torres
(74) *Attorney, Agent, or Firm* — Zilka-Kotab, P.C.

(57) ABSTRACT

Object re-identification refers to a process by which images that contain an object of interest are retrieved from a set of images captured using disparate cameras or in disparate environments. Object re-identification has many useful applications, particularly as it is applied to people (e.g. person tracking). Current re-identification processes rely on convolutional neural networks (CNNs) that learn re-identification for a particular object class from labeled training data specific to a certain domain (e.g. environment), but that do not apply well in other domains. The present disclosure provides cross-domain disentanglement of id-related and id-unrelated factors. In particular, the disentanglement is performed using a labeled image set and an unlabeled image set, respectively captured from different domains but for a same object class. The identification-related features may then be used to train a neural network to perform re-identification of objects in that object class from images captured from the second domain.

20 Claims, 6 Drawing Sheets

```
Access a plurality of labeled first images captured from a first
domain and a plurality of second images captured from a second
domain, wherein the plurality of first images and the plurality of
second images are associated with the particular object class
                              102
```

```
Disentangle identification-related features and identification-
unrelated features from the plurality of first images and the
                  plurality of second images
                              104
```

(51) Int. Cl.
  *G06K 9/62* (2022.01)
  *G06N 3/04* (2006.01)
  *G06N 3/08* (2006.01)
  *G06V 10/40* (2022.01)
  *G06V 20/40* (2022.01)
  *G06V 30/262* (2022.01)

(52) U.S. Cl.
  CPC ............. *G06K 9/6262* (2013.01); *G06N 3/04* (2013.01); *G06N 3/088* (2013.01); *G06V 10/40* (2022.01); *G06V 20/46* (2022.01); *G06V 30/274* (2022.01)

(58) Field of Classification Search
  CPC ................ G06K 9/6262; G06K 9/726; G06K 2009/3291; G06K 9/6273; G06N 3/04; G06N 3/088; G06N 3/0454; G06N 3/0481
  USPC .......................................................... 382/159
  See application file for complete search history.

(56) References Cited

U.S. PATENT DOCUMENTS

| | | | |
|---|---|---|---|
| 2020/0184256 A1* | 6/2020 | Ye | G06K 9/6223 |
| 2020/0226421 A1* | 7/2020 | Almazan | G06K 9/00771 |
| 2021/0064853 A1* | 3/2021 | Ham | G06K 9/6262 |

OTHER PUBLICATIONS

Wei et al., "Person Transfer GAN to Bridge Domain Gap for Person Re-Identification," CVPR, 2018, pp. 79-88, retrieved from https://openaccess.thecvf.com/content_cvpr_2018/papers/Wei_Person_Transfer_GAN_CVPR_2018_paper.pdf, (Year 2018).

Huang et al., "Multimodal Unsupervised Image-to-Image Translation," ECCV, 2018, pp. 1-18, retrieved from https://openaccess.thecvf.com/content_ECCV_2018/papers/Xun_Huang_Multimodal_Unsupervised_Image-to-Image_ECCV_2018_paper.pdf, (Year 2018).

Lee et al., "Diverse Image-to-Image Translation via Disentangled Representations," ECCV, 2018, pp. 1-17, retrieved from https://github.com/HsinYingLee/DRIT, (Year 2018).

Zhu et al., "Unpaired Image-to-Image Translation using Cycle-Consistent Adversarial Networks," ICCV, 2017, pp. 2223-2232, retrieved from https://openaccess.thecvf.com/content_ICCV_2017/papers/Zhu_Unpaired_Image-To-Image_Translation_ICCV_2017_paper.pdf, (Year 2017).

Tang et al., "Unsupervised Person Re-Identification with Iterative Self-Supervised Domain Adaptation," CVPRW, 2019, 8 pages, retrieved from https://openaccess.thecvf.com/content_CVPRW_2019/papers/TRMTMCT/Tang_Unsupervised_Person_Re-Identification_With_Iterative_Self-Supervised_Domain_Adaptation_CVPRW_2019_paper.pdf, (Year 2019).

Ester et al., "A Density-Based Algorithm for Discovering Clusters in Large Spatial Databases with Noise," Proceedings of KDD-96, 1996, pp. 226-231, (Year 1996).

\* cited by examiner

CROSS-DOMAIN IMAGE PROCESSING FOR OBJECT RE-IDENTIFICATION

CLAIM OF PRIORITY

This application claims the benefit of U.S. Provisional Application No. 62/892,118 titled "CROSS-DOMAIN DISENTANGLEMENT AND ADAPTATION FOR PERSON RE-IDENTIFICATION AND UNARY-STEAM NETWORK FOR VIDEO ACTION RECOGNITION," filed Aug. 27, 2019, the entire contents of which is incorporated herein by reference.

TECHNICAL FIELD

The present disclosure relates to object re-identification.

BACKGROUND

Object re-identification refers to a process by which images that contain an object of interest are retrieved from a set of images captured using disparate cameras or even a same camera positioned in different locations or environments. Object re-identification has many useful applications, particularly as it is applied to people. For example, person re-identification can be used to track people over time. Other applications may relate to animals (e.g. when taking inventory), fashion (e.g. virtual clothes fitting), among others.

Current state-of-the-art re-identification processes rely on convolutional neural networks (CNNs), which considerably improve re-identification performance. In some cases, supervised learning algorithms have been employed by CNNs to learn re-identification for a particular object class from labeled training data. Unfortunately, the accuracy of these CNNs is dependent the testing data being from a same domain as the training data (e.g. a same environment, a same camera network, etc.), such that the resulting models are typically domain-dependent and exhibit dramatic performance degradation when deployed to new domains. However, generating labeled training data for a vast set of domains is costly and generally prohibitive with respect to obtaining trained CNNs for all required domains.

In order to bridge this gap resulting from cross-domain settings, namely where training data and testing data are from different domains, an unsupervised domain adaptation has been used as an extension to the above described domain-dependent model, which uses both labeled data in the source (i.e. training) domain and unlabeled data in the target (i.e. test) domain to improve performance of the model in the target domain. The unsupervised domain adaptation specifically aligns feature distributions across the domains to reduce the gap between the source and the target. The adaption is generally provided at an input-level and/or feature-level, and thus operates on the feature space which encodes both id-related and id-unrelated factors. However, consideration of the id-unrelated factors impairs the adaption of the id-related features, and therefore restricts the performance gained through unsupervised domain adaptation.

There is a need for addressing these issues and/or other issues associated with the prior art.

SUMMARY

A method, computer readable medium, and system are disclosed for cross-domain image processing for object re-identification. In use, a plurality of labeled first images captured from a first domain and a plurality of second images captured from a second domain are accessed, wherein the plurality of labeled first images and the plurality of second images are associated with the particular object class. Further, identification-related features and identification-unrelated features from the plurality of labeled first images and the plurality of second images are disentangled.

DETAILED DESCRIPTION

Figure 1:
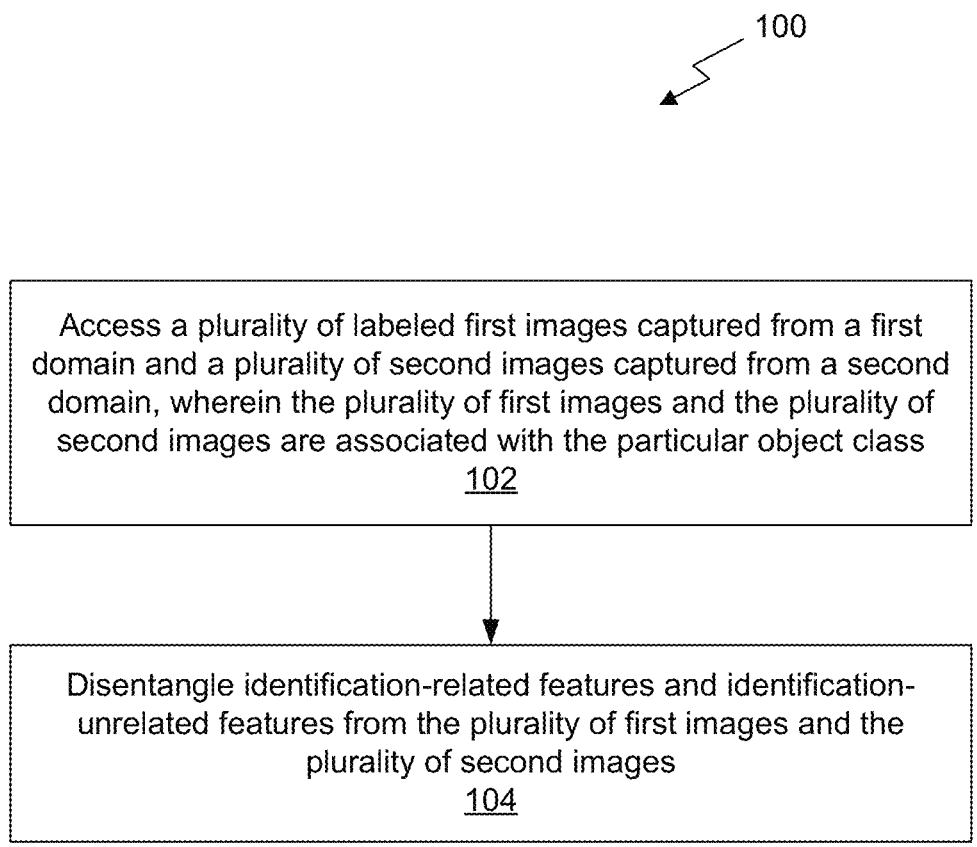
FIG. 1 illustrates a flowchart of a method for cross-domain disentanglement of identification-related and identification-unrelated features, in accordance with an embodiment.

FIG. 1 illustrates a flowchart of a method 100 for cross-domain disentanglement of identification-related and identification-unrelated features, in accordance with an embodiment. Each operation of method 100, described herein, comprises a computing process that may be performed using any combination of hardware, firmware, and/or software. For instance, various functions may be carried out by a processor executing instructions stored in memory. The method 100 may also be embodied as computer-usable instructions stored on computer storage media. The method 100 may be provided by a standalone application, a service or hosted service (standalone or in combination with another hosted service), or a plug-in to another product, to name a few. In addition, method 100 may be executed by any one system, or any combination of systems, including, but not limited to, those described herein.

In operation 102, a plurality of labeled first images captured from a first domain and a plurality of second images captured from a second domain are accessed. In the context of the present description, the plurality of labeled first images and the plurality of second images are associated with the particular object class. The particular object class may be persons, a type of animals (e.g. cows, pigs, etc.), a type of clothing (e.g. pants, etc.), a type of vehicle (e.g. sedan, etc.), or any other class of objects capable of being distinguished by certain appearance features.

As noted above, the labeled first images and the second images are captured from first and second domains, respectively. The first and second domains may refer to different environments from which the labeled first images and the second images are captured, in one embodiment. In another embodiment, the first and second domains may refer to different camera networks from which the labeled first images and the second images are captured. Just by way of example, the first domain and the second domain may differ in season, background, viewpoint, illumination, source camera, etc. To this end, while the labeled first images and the second images capture objects of a same object class, such that the objects may have similar appearance features, the labeled first images and the second images may have different structure features as a result of the different domains from which they are captured.

As also noted above, the first images captured from the first domain are labeled. Such labeling may refer to annotations included with the images that specify appearance features of the images. In one embodiment, the labeled first images may be included in a training data set generated with labels for use in training a neural network, such that the first domain may be referred to as a source domain or a training domain. On the other hand, the second images may be unlabeled. For example, the second images may not necessarily be included in a training data set, but instead may be captured from the second domain which may be referred to as a test domain for which object re-identification is to be performed (see subsequent figures and description below for more detail).

It should be noted that the labeled first images and the second images may be accessed from any computer storage(s) storing the same. Accessing the images may refer to identifying, retrieving, or otherwise obtaining the images from the computer storage(s) for use in further processing as described below.

Further, as shown in operation 104, identification-related features and identification-unrelated features from the plurality of labeled first images and the plurality of second images are disentangled. In other words, while the labeled first images and the second images may each include identification-related features and identification-unrelated features, those identification-related features may be differentiated from the identification-unrelated features. The identification-related features may be any features that are capable of being used to identify objects of the particular object class, whereas the identification-unrelated features may be any features that are not capable of being used to identify objects of the particular object class. For example, the identification-related features may be appearance features (i.e. features related to an appearance of the objects of the particular object class, such as color, texture, style, etc.), and the identification-unrelated features may be structure features (i.e. features related to a structure of or within the images, such as pose, position, viewpoint, illumination, background, etc.).

In one embodiment, the disentangling may be performed using a plurality of encoders of a neural network. For example, the disentangling may be performed an appearance encoder shared across the first domain and the second domain which extracts the identification-related features from the labeled first images and the second images. Additionally, a first structure encoder specific to the first domain may extract a first portion of the identification-unrelated features from the plurality of labeled first images, and a second structure encoder specific to the second domain may extract a second portion of the identification-unrelated features from the plurality of second images.

In another embodiment, the disentangling may be performed using image pairs selected from the labeled first images and the second images. For example, for an original image pair that includes a select labeled first image and a select second image, appearance or structure features may be extracted from the image pair, and the appearance or structure features may be swapped between the images to generate a pair of cross-domain synthesized images. In a further embodiment, the appearance or structure features may be extracted from the pair of cross-domain synthesized images, and the appearance or structure features may be swapped between the pair of cross-domain synthesized images to reconstruct the images in the original image pair.

This process may be referred to as cross-domain cycle consistency process, where the identification-related features are ultimately captured using the identity labels of the labeled first image in the original image pair and at least one loss function. More details regarding the cross-domain cycle consistency process will be described below with reference to the remaining Figures. To this end, the method 100 may be carried out to disentangle (i.e. differentiate) the identification-related features within the first and second image sets from the identification-unrelated features within the first and second image sets. The identification-related features may then be used to further train a neural network to perform re-identification of objects in the particular object class from images captured from the second domain.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
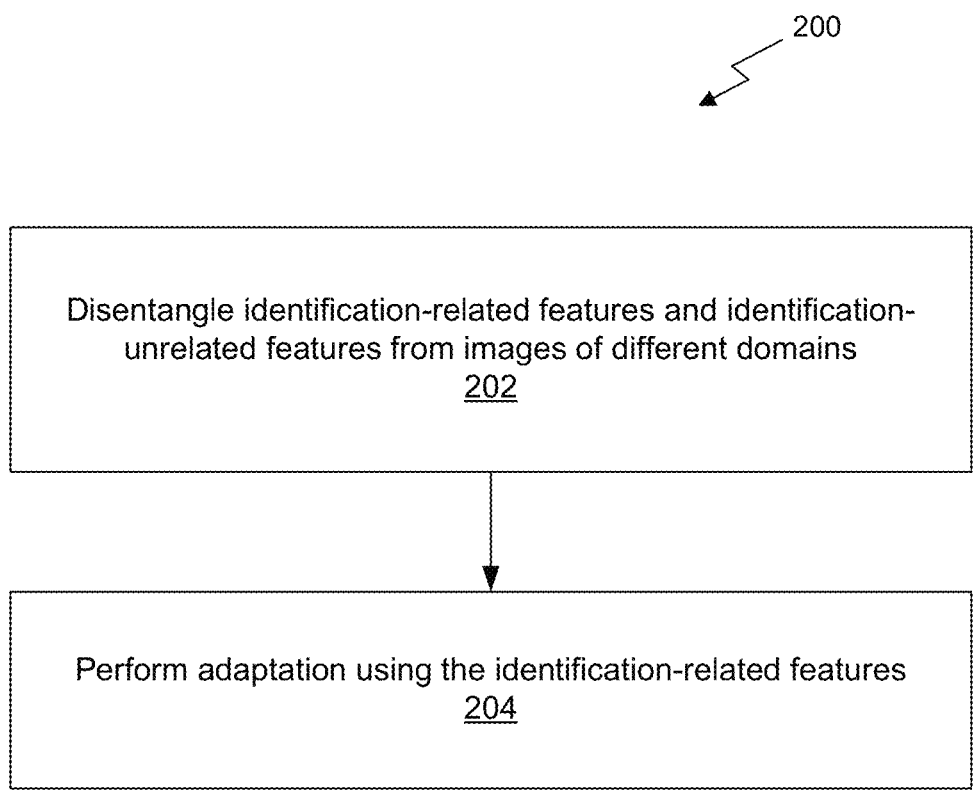
FIG. 2 illustrates a flowchart of a method for performing joint disentanglement and adaptation for cross-domain object re-identification, in accordance with an embodiment.

FIG. 2 illustrates a flowchart of a method 200 for performing joint disentanglement and adaptation for cross-domain object re-identification, in accordance with an embodiment. The method 200 may be carried out in the context of the details of the method 100 of FIG. 1. Of course, however, the method 200 may be carried out in any desired context. The aforementioned definitions may equally apply to the description below.

In operation 202, identification-related features and identification-unrelated features are disentangled from images of different (i.e. first and second) domains. In one embodiment, a cross-domain cycle-consistency scheme may be used to perform the disentangling of the identification-related/unrelated features without any target supervision.

In operation 204, adaptation is performed using the identification-related features. The adaptation aligns feature distributions across the first domain and the second domain. In one embodiment, the adaptation involves adversarial alignment and self-training, which are co-designed with the disentangling process to target the identification-related features and thus adapt more effectively by avoiding the identification-unrelated features. Through adaptation, the domain-invariant features and the discriminative features are learned which facilitates re-identification for the particular object class in the second domain.

By this design, the method 200 provides a joint learning framework that disentangles identification-related/unrelated features so that the adaptation can be more effectively performed on the identification-related features while preventing interference of the identification-unrelated features.

Figure 3:
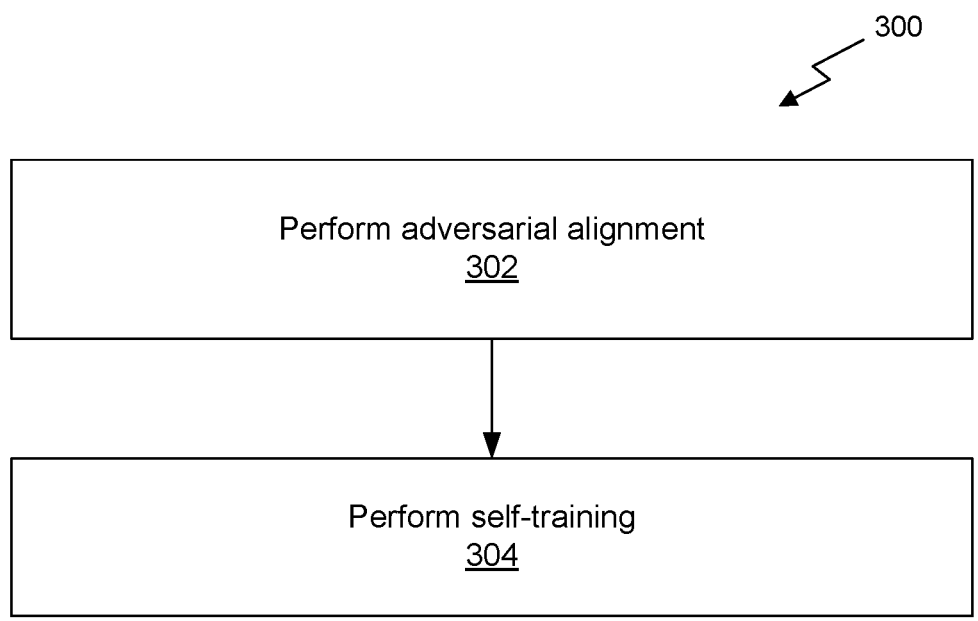
FIG. 3 illustrates a flowchart of a method for performing adaptation using the disentangled identification-related and identification-unrelated features, in accordance with an embodiment.

FIG. 3 illustrates a flowchart of a method 300 for performing adaptation using the disentangled identification-related and identification-unrelated features, in accordance with an embodiment. The method 300 may be carried out in the context of the details of the method 200 of FIG. 2. Of course, however, the method 300 may be carried out in any desired context. The aforementioned definitions may equally apply to the description below.

In operation 302, adversarial alignment is performed. In particular, the adversarial alignment is performed on the identification-related features only. During adversarial alignment training, an appearance encoder (shared across the first and second domains), which extracted the identification-related features, learns to produce appearance features of which membership between the first domain and the second domain cannot be differentiated to reduce a distance between cross-domain appearance feature distributions.

In operation 304, self-training is performed. With regard to the self-training, the disentangling is supported by forcing appearance features of different identities to stay apart while reducing intra-class variations of a same identity. Performing the adaptation with self-training causes the appearance encoder to learn both domain-invariant features and discriminative features. The domain-invariant features and the discriminative features facilitate re-identification for the particular object class in the second domain.

Figure 4:
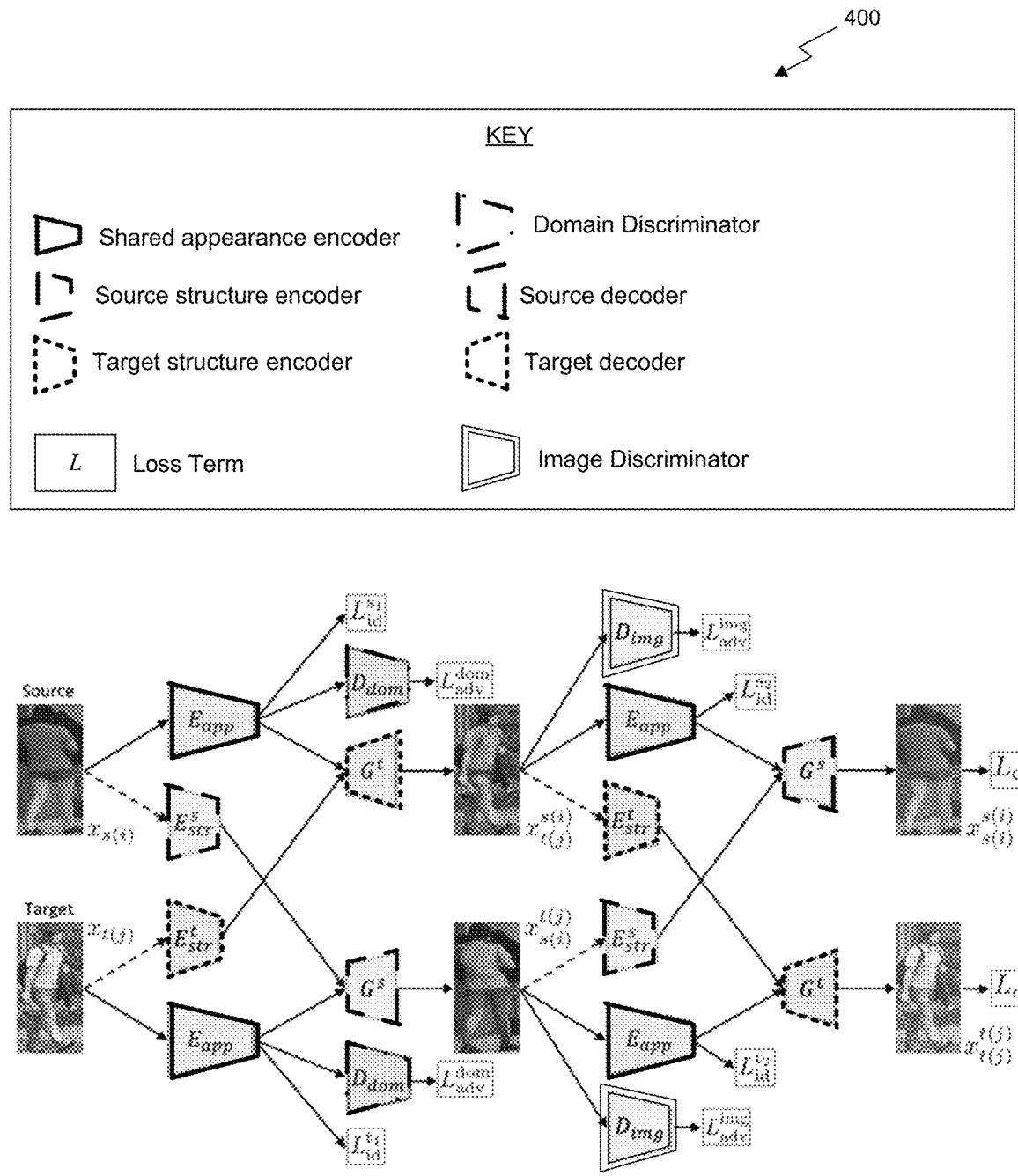
FIG. 4 illustrates the architecture of a neural network for performing joint disentanglement and adaptation for cross-domain object re-identification, in accordance with an embodiment.

FIG. 4 illustrates the architecture of a neural network 400 for performing joint disentanglement and adaptation for cross-domain object re-identification, in accordance with an embodiment. The neural network 400 may be implemented to carry out the methods of the Figures described above. Of course, however, the neural network 400 may be implemented in any desired context. The aforementioned definitions may equally apply to the description below.

Successful cross-domain disentangling can create a desirable foundation for more targeted and effective domain adaptation, as described in the embodiments above. To this end, a cross-domain, cycle-consistent image generation is provided with three latent spaces modeled by corresponding encoders to decompose images from different domains (i.e. referred to as source and target domains and respective images, in the present embodiment). The latent spaces incorporate a shared appearance space that captures identification-related features (e.g. appearance and other semantics), as well as a source structure space and a target structure space that contain identification-unrelated features (e.g. pose, position, viewpoint, background and other variations). The encoded features in the three spaces are also referred to herein as codes. An adaptation module including adversarial alignment and self-training is exclusively conducted in the shared appearance space.

This design forms a joint framework that creates mutually beneficial cooperation between the disentangling and adaptation modules: (1) disentanglement leads to better adaptation as we can make the latter focus on id-related features and mitigate the interference of id-unrelated features, and (2) adaptation in turn improves disentangling as the shared appearance encoder gets enhanced during adaptation. The proposed cross-domain joint disentangling and adaptation learning framework may be referred to as DG-Net++.

The main contributions, as described in detail below, include:

1) A joint learning framework for unsupervised cross-domain object (e.g. person) re-identification to disentangle identification-related/unrelated features so that adaptation can be more effectively performed on the identification-related space.

2) Across-domain cycle-consistency scheme for domain adaptive object re-identification to realize the desired disentanglement.

3) The disentanglement and adaptation are co-designed to let the two modules mutually promote each other.

The neural network 400 illustrates the cross-domain cycle-consistency image generation. The disentangling and adaptation modules are connected by the shared appearance encoder. The two domains also share the image and domain discriminators, but have their own structure encoders and decoders. A dash line indicates that the input image to the source/target structure encoder is converted to gray-scale.

Disentangling Module—Formulation

We denote the real images and labels in source domain as $X_s=\{x_{s(i)}\}_{i=1}^{N_s}$ and $Y_s=\{y_{s(i)}\}_{i=1}^{N_s}$, where s indicates source domain, $N_s$ is the number of source images, $y_{s(i)} \in [1, K_s]$ and $K_s$ is the number of source identities. Similarly, $X_t = \{x_{t(i)}\}_{i=1}^{N_t}$ denotes $N_t$ real images in target domain t. Given a source image $x_{s(i)}$ and a target image $x_{t(j)}$, a new cross-domain synthesized image can be generated by swapping the appearance or structure codes between the two images. As shown, the disentangling module consists of a shared appearance encoder $E_{app}:x \rightarrow v$, a source structure encoder $E_{str}^s:x_{s(i)} \rightarrow T_{s(i)}$, a target structure encoder $E_{str}^t:x_{t(j)} \rightarrow T_{t(j)}$, a source decoder $G^s:(v_{t(j)}, T_{s(i)}) \rightarrow x_{s(i)}^{t(j)}$, a target decoder $G^t:(v_{s(i)}, T_{t(j)}) \rightarrow x_{t(j)}^{s(i)}$, an image discriminator $D_{img}$ to distinguish between real and synthesized images, and a domain discriminator $D_{dom}$ to distinguish between source and target domains. Note: for synthesized images, superscript is used to indicate the real image providing appearance code and subscript is used to denote the one giving structure code; for real images, they only have subscript as domain and image index. The adaptation and final re-identification are conducted using the appearance codes.

Disentangling Module—Cross-Domain Generation

Cross-domain cycle-consistency image generation is introduced to enforce disentangling between appearance and structure features. Given a pair of source and target images, their appearance or structure codes are swapped to synthesize new images. Since there exists no ground-truth supervision for the synthetic images, cycle-consistency self-supervision is used to reconstruct the two real images by swapping the appearance or structure codes extracted from the synthetic images. As demonstrated in the neural network 400, given a source image $x_{s(i)}$ and a target image $x_{t(j)}$, the synthesized images $x_{t(j)}^{s(i)} = G^t(v_{s(i)}, T_{t(j)})$ and $x_{s(i)}^{t(j)} = G^s(v_{t(j)}, T_{s(i)})$ are required to respectively preserve the corresponding appearance and structure codes from $x_{s(i)}$ and $x_{t(j)}$ to be able to reconstruct the two original real images: $x_{t(j)}$ $$L_{cyc} = \mathbb{E}[\|x_{s(i)} - G^s(E_{app}(x_{t(j)}^{s(i)}), E_{str}^s(x_{s(i)}^{t(j)}))\|_1] + \mathbb{E}[\|x_{t(j)} - G^t(E_{app} x_{s(i)}^{t(j)}), E_{str}^t(x_{t(j)}^{s(i)}))\|_1]. \quad \text{Equation 1}$$

With the identity labels available in source domain, the shared appearance encoder is explicitly enforced to capture the identification-related information by using the identification loss:

$$L_{id}^{s1} = \mathbb{E}[-\log(p(y_{s(i)}|x_{s(i)}))], \quad \text{Equation 2}$$

where $p(y_{s(i)}|x_{s(i)})$ the predicted probability that $x_{s(i)}$ belongs to the ground-truth label $y_{s(i)}$. We also apply the identification loss on the synthetic image that retains the appearance code from source image to keep identity consistency:

$$L_{id}^{s2} = \mathbb{E}[-\log(p(y_{s(i)}|x_{t(j)}^{s(i)}))], \quad \text{Equation 3}$$

where $(p(y_{s(i)}|x_{t(j)}^{s(i)})$ is the predicted probability of $x_{t(j)}^{s(i)})$ belonging to the ground-truth label $y_{s(i)}$ of $x_{s(i)}$. In addition, adversarial loss is employed to match the distributions between the synthesized images and the real data:

$$L_{adv}^{img} = \mathbb{E}[\log D_{img}(x_{s(i)}) + \log(1 - D_{img}(x_{t(j)}^{s(i)}))] + \mathbb{E}[\log D_{img}(x^{t(j)}) + \log(1 - D_{img}(x_{s(i)}^{t(j)}))]. \quad \text{Equation 4}$$

Note that the image discriminator $D_{img}$ is shared across domains to force the synthesized images to be realistic regardless with domains. This can indirectly drive the shared appearance encoder to learn domain-invariant features.

Apart from the cross-domain generation, the disentangling module is also flexible to incorporate a within-domain generation, which can be used to further stabilize and regulate within-domain disentanglement.

Adaptation Module—Adversarial Alignment

Although the weights of the appearance encoder are shared between source and target domains, the appearance representations across domains are still not ensured to have similar distributions. To encourage the alignment of appearance features in two domains, a domain discriminator $D_{dom}$ is used, which aims to distinguish the domain membership of the encoded appearance codes $v_{s(i)}$ and $v_{t(j)}$. During adversarial training, the shared appearance encoder learns to produce appearance features of which domain membership cannot be differentiated by $D_{dom}$, such that the distance between cross-domain appearance feature distributions can be reduced. This domain appearance adversarial alignment loss is expressed as:

$$L_{adv}^{dom} = \mathbb{E}[\log D_{dom}(v_{s(i)}) + \log(1 - D_{dom}(v_{t(j)}))] + \mathbb{E}[\log D_{dom}(v_{t(j)}) + \log(1 - D_{dom}(v_{s(i)}))]. \quad \text{Equation 5}$$

Adaptation Module—Self-Training

In addition to the global feature alignment imposed by the above domain adversarial loss, self-training is incorporated into the adaptation module. Essentially, self-training with identification loss is an entropy minimization process that gradually reduces intra-class variations. It implicitly closes the cross-domain feature distribution distance in the shared appearance space, and meanwhile encourages discriminative appearance feature learning.

A set of pseudo-labels $\hat{Y}_t = \{\hat{y}_{t(j)}\}$ are iteratively generated based on the reliable identity predictions in the target domain, and the network 400 is refined using the pseudo-labeled target images. Note the numbers of pseudo-identities and labeled target images may change during self-training. In practice, the pseudo-labels are produced by clustering the target features that are extracted by the shared appearance encoder $E_{app}$. The same pseudo-label is assigned to the samples within the same cluster. An affinity based clustering method may be used. Additionally, K-reciprocal encoding may be used to compute pair-wise distances, and update pseudo-labels every two epochs. With the pseudo-labels obtained by self-training in the target domain, the identification loss is applied on the shared appearance encoder:

$$L_{id}^{t1} = \mathbb{E}[-\log(p(\hat{y}_{t(j)} | x_{t(j)}))], \quad \text{Equation 6}$$

where $p(\hat{y}_{t(j)} | x_{t(j)})$ is the predicted probability that $x_{t(j)}$ belongs to the pseudo-label $\hat{y}_{t(j)}$. The identification loss is enforced on the synthetic image that reserves the appearance code from the target image to keep pseudo-identity consistency:

$$L_{id}^{t2} = \mathbb{E}[-\log(p(\hat{y}_{t(j)} | x_{s(i)}^{t(j)}))], \quad \text{Equation 7}$$

where $p(\hat{y}_{t(j)} | x_{s(i)}^{t(j)})$ is the predicted probability of $x_{s(i)}^{t(j)}$ belonging to the pseudo-label $\hat{y}_{t(j)}$ of $x_{t(j)}$. Overall, adaptation with self-training encourages the shared appearance encoder to learn both domain-invariant and discriminative features that can generalize and facilitate re-identification in the target domain.

The disentangling and adaptation are co-designed to let the two modules positively interact with each other. On the one hand, disentangling promotes adaptation. Based on the cross-domain cycle-consistency image generation, the disentangling module learns detached appearance and structure factors with explicit and explainable meanings, which pave the way for adaptation to exclude identification-unrelated noises and specifically operate on identification-related features. With the help of the shared appearance encoder, the discrepancy between cross-domain feature distributions can be reduced. Also the adversarial loss for generating realistic images across domains encourages feature alignment through the shared image discriminator. On the other hand, adaptation facilitates disentangling. In addition to globally closing the distribution gap, the adversarial alignment by the shared domain discriminator helps to find the common appearance embedding that can assist disentangling appearance and structure features. Besides implicitly aligning cross-domain features, the self-training with the identification loss supports disentangling since it forces the appearance features of different identities to stay apart while reducing the intra-class variation of the same identity.

Optimization

We jointly train the shared appearance encoder, image discriminator, domain discriminator, source and target structure encoders, as well as source and target decoders to optimize the total objective, which is a weighted sum of the following loss terms:

$$L_{total}(E_{app}, D_{img}, D_{dom}, E_{str}^s, E_{str}^t, G^s, G^t) = \lambda_{cyc} L_{cyc} + L_{id}^{s1} + L_{id}^{t1} + \lambda_{id} L_{id}^{s2} + \lambda_{id} L_{id}^{t2} + L_{adv}^{img} + L_{adv}^{dom}, \quad \text{Equation 8}$$

where $\lambda_{cyc}$ and $\lambda_{id}$ are the weights to control the importance of cross-domain cycle-consistent self-supervision loss and identification loss on synthesized images. Following image-to-image translations, a large weight is set $\lambda_{cyc} = 2$ for $L_{cyc}$. As the quality of cross-domain synthesized images is not great at the early stage of training, the two losses $L_{id}^{s2}$ and $L_{id}^{t2}$ on such images would make training unstable, so a relatively small weight $\lambda_{id} = 0.5$ is used. The weights are fixed during the entire training process. We first warm up $E_{app}$, $E_{str}^s$, $G^s$ and $D_{img}$ with the disentangling module in source domain for 100,000 iterations, then bring in the adversarial alignment to train the whole network for another 50,000 before self-training. In the process of self-training, all components are co-trained, and the pseudo-labels are updated every two epochs. We follow the alternative updating policy in training GANs to alternatively train $E_{app}$, $E_{str}^s$, $E_{str}^t$, $G^s$, $G^t$, and $D_{img}$, $D_{dom}$.

Embodiments disclosed with respect to FIGS. 1-4 may optionally be implemented in the context of object re-identification performed within a gaming environment, such as the game streaming system disclosed below. Of course, other computer vision applications are contemplated as well in which the above disclosed embodiments cross-domain image processing for object re-identification may be performed.

Example Game Streaming System

Figure 5:
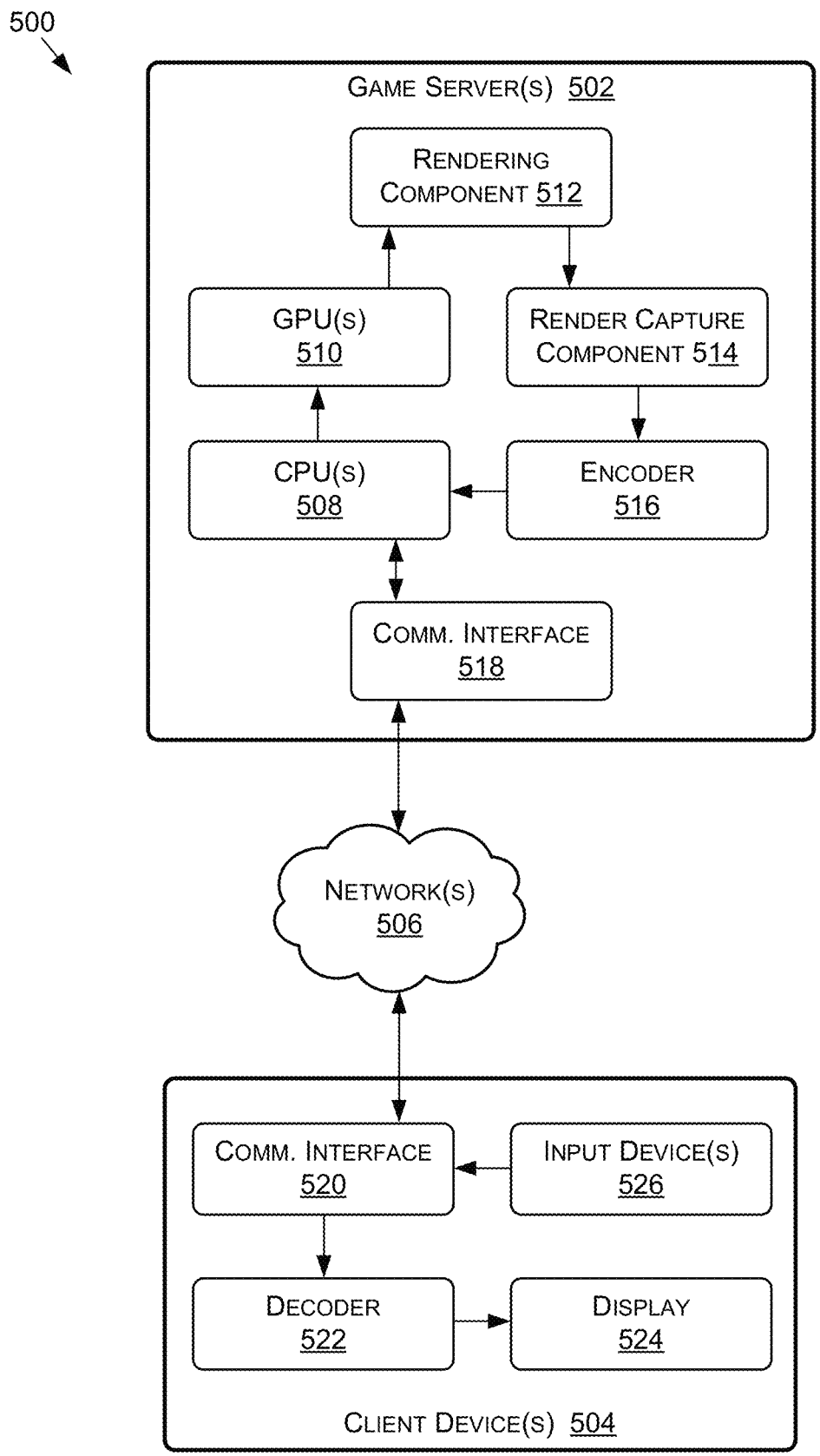
FIG. 5 is a block diagram of an example game streaming system suitable for use in implementing some embodiments of the present disclosure.

FIG. 5 is an example system diagram for a game streaming system 500, in accordance with some embodiments of the present disclosure. FIG. 5 includes game server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented.

In the system 500, for a game session, the client device(s) 504 may only receive input data in response to inputs to the input device(s) 526, transmit the input data to the game server(s) 502, receive encoded display data from the game server(s) 502, and display the display data on the display 524. As such, the more computationally intense computing and processing is offloaded to the game server(s) 502 (e.g., rendering—in particular ray or path tracing—for graphical output of the game session is executed by the GPU(s) 510 of the game server(s) 502). In other words, the game session is streamed to the client device(s) 504 from the game server(s) 502, thereby reducing the requirements of the client device(s) 504 for graphics processing and rendering.

For example, with respect to an instantiation of a game session, a client device 504 may be displaying a frame of the game session on the display 524 based on receiving the display data from the game server(s) 502. The client device 504 may receive an input to one of the input device(s) 526 and generate input data in response. The client device 504 may transmit the input data to the game server(s) 502 via the communication interface 520 and over the network(s) 506 (e.g., the Internet), and the game server(s) 502 may receive the input data via the communication interface 518. The CPU(s) 508 may receive the input data, process the input data, and transmit data to the GPU(s) 510 that causes the GPU(s) 510 to generate a rendering of the game session. For example, the input data may be representative of a movement of a character of the user in a game, firing a weapon, reloading, passing a ball, turning a vehicle, etc. The rendering component 512 may render the game session (e.g., representative of the result of the input data) and the render capture component 514 may capture the rendering of the game session as display data (e.g., as image data capturing the rendered frame of the game session). The rendering of the game session may include ray or path-traced lighting and/or shadow effects, computed using one or more parallel processing units—such as GPUs 510, which may further employ the use of one or more dedicated hardware accelerators or processing cores to perform ray or path-tracing techniques—of the game server(s) 502. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
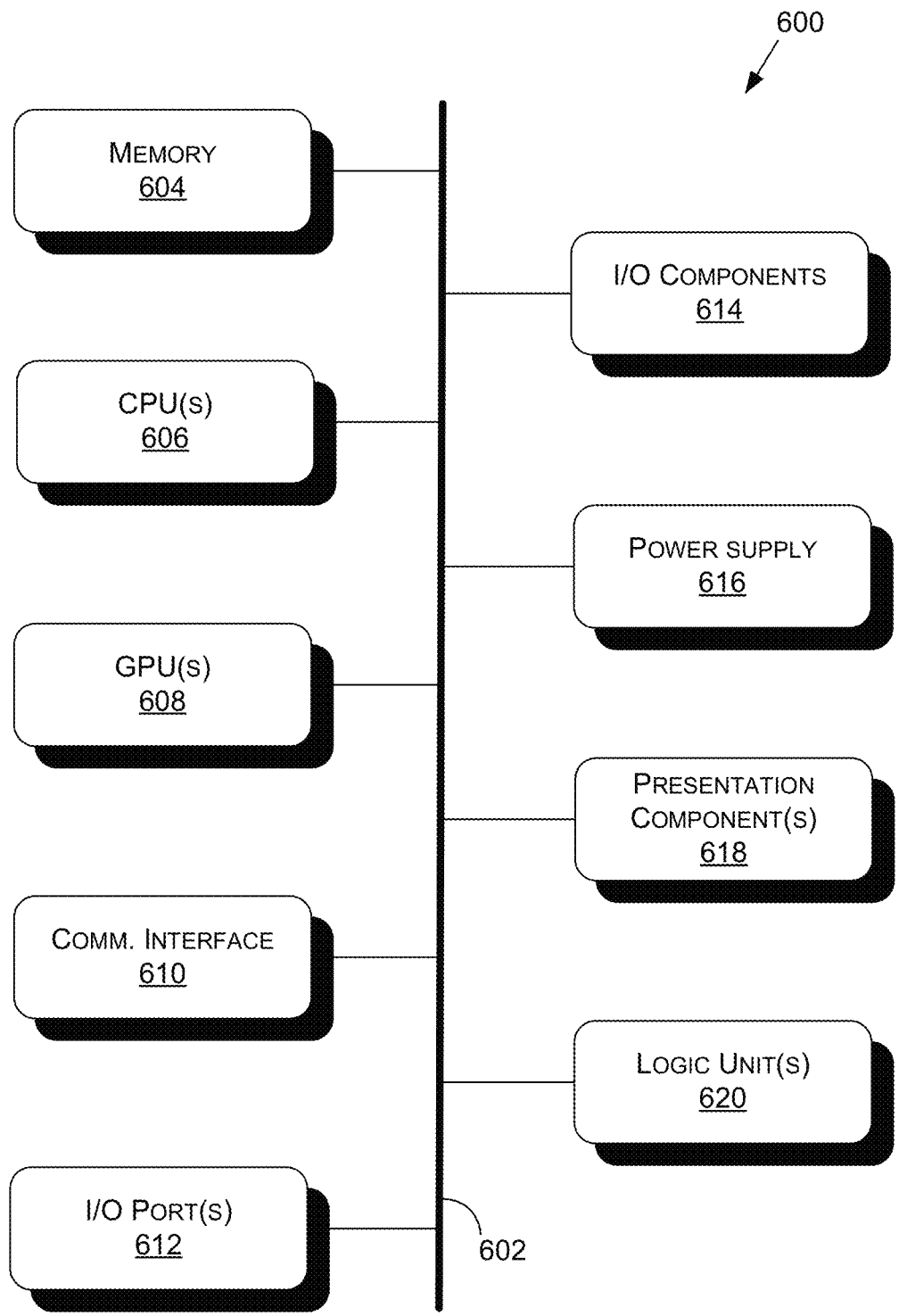
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
   accessing a plurality of labeled first images captured from a first domain and a plurality of second images captured from a second domain, wherein the plurality of labeled first images and the plurality of second images are associated with the particular object class; and
   disentangling identification-related features and identification-unrelated features from the plurality of labeled first images and the plurality of second images.

2. The method of claim 1, wherein the first domain and the second domain differ in at least one of season, background, viewpoint, illumination, or source camera.

3. The method of claim 1, wherein the plurality of second images are unlabeled.

4. The method of claim 1, wherein the identification-related features include appearance features.

5. The method of claim 1, wherein the identification-unrelated features include at least one of pose, position, viewpoint, illumination, or background.

6. The method of claim 1, wherein the disentangling is performed by:
   extracting, by an appearance encoder shared across the first domain and the second domain, the identification-related features from the plurality of labeled first images and the plurality of second images;
   extracting, by a first structure encoder specific to the first domain, a first portion of the identification-unrelated features from the plurality of labeled first images; and
   extracting, by a second structure encoder specific to the second domain, a second portion of the identification-unrelated features from the plurality of second images.

7. The method of claim 1, wherein the first domain is a training domain and the second domain is a test domain.

8. The method of claim 1, wherein the disentangling is performed by:
   extracting appearance or structure features of a select labeled first image of the plurality of labeled first images and a select second image of the plurality of second images, and
   swapping the appearance or structure features between the select labeled first image and the select second image to generate a pair of cross-domain synthesized images.

9. The method of claim 8, wherein the disentangling is further performed by:
   extracting the appearance or structure features from the pair of cross-domain synthesized images,
   swapping the appearance or structure features between the pair of cross-domain synthesized images to reconstruct the select labeled first image and the select second image.

10. The method of claim 9, wherein the identification-related features are captured using identity labels of the select labeled first image and at least one loss function.

11. The method of claim 1, further comprising:
    performing adaptation using the identification-related features, wherein the adaptation aligns feature distributions across the first domain and the second domain.

12. The method of claim 11, wherein the adaptation is performed using self-training and adversarial alignment.

13. The method of claim 12, wherein an appearance encoder shared across the first domain and the second domain extracts the identification-related features from the plurality of labeled first images and the plurality of second images, and
    wherein during adversarial alignment training, the appearance encoder learns to produce appearance features of which membership between the first domain and the second domain cannot be differentiated to reduce a distance between cross-domain appearance feature distributions.

14. The method of claim 13, wherein the self-training supports the disentangling by forcing appearance features of different identities to stay apart while reducing intra-class variations of a same identity.

15. The method of claim 14, wherein performing the adaptation with self-training causes the appearance encoder to learn both domain-invariant features and discriminative features.

16. The method of claim 15, wherein learning the domain-invariant features and the discriminative features facilitates re-identification for the particular object class in the second domain.

17. A neural network, comprising:
    a disentangling module configured to:
       access a plurality of labeled first images captured from a first domain and a plurality of second images captured from a second domain, wherein the plurality of labeled first images and the plurality of second images are associated with the particular object class, and
       disentangle identification-related features and identification-unrelated features from the plurality of labeled first images and the plurality of second images.

18. The neural network of claim 17, wherein the neural network further comprises:
    an adaptation module configured to:
    access the identification-related features disentangled by the disentangling module, and
    learn both domain-invariant features and discriminative features for use in re-identification for the particular object class in the second domain.

19. The neural network of claim 18, wherein the adaptation module performs adaptation using self-training and adversarial alignment.

20. A non-transitory computer-readable media storing computer instructions that, when executed by one or more processors, cause the one or more processors to perform a method comprising:
    accessing a plurality of labeled first images captured from a first domain and a plurality of second images captured from a second domain, wherein the plurality of labeled first images and the plurality of second images are associated with the particular object class; and
    disentangling identification-related features and identification-unrelated features from the plurality of labeled first images and the plurality of second images.

* * * * *